No. 841,624. PATENTED JAN. 15, 1907.
R. N. CAUGHELL.
BICYCLE LOCK.
APPLICATION FILED JULY 18, 1906.
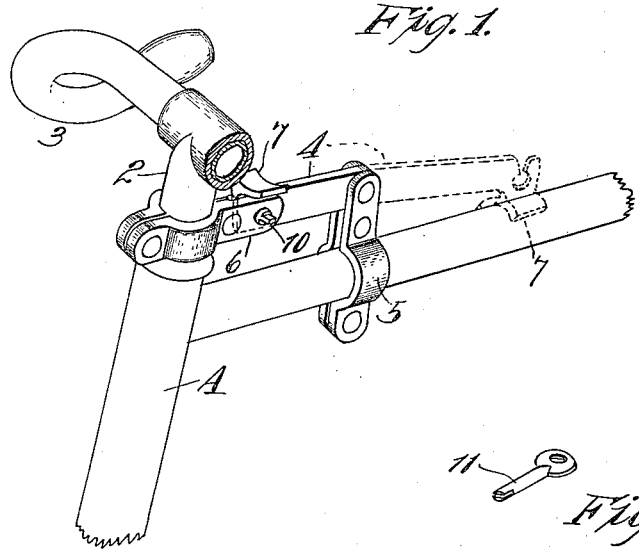
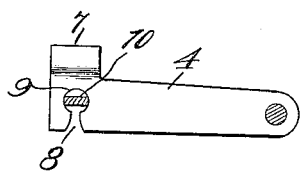
WITNESSES:
F. E. Maynard
INVENTOR
Robert Nelson Caughell
BY
Geo. H. Strong,
ATTORNEY

UNITED STATES PATENT OFFICE.

ROBERT NELSON CAUGHELL, OF COLONY CENTER, CALIFORNIA.

BICYCLE-LOCK.

No. 841,624.                Specification of Letters Patent.        Patented Jan. 15, 1907.

Application filed July 18, 1906. Serial No. 326,707.

*To all whom it may concern:*

Be it known that I, ROBERT NELSON CAUGHELL, a citizen of the United States, residing at Colony Center, in the county of Merced and State of California, have invented new and useful Improvements in Bicycle-Locks, of which the following is a specification.

My invention relates to an attachment for vehicles, and especially to a lock for locking the steering-post rigid to the frame. Its object is to provide a simple easily-manipulated means for locking the front wheel against turning, so that the bicycle may be stood up against a post or building or other support without the bicycle being liable to fall over, said means also affording a safeguard against the bicycle being stolen when left unguarded on the street or in other exposed places.

The invention consists of the parts and the construction and combination of parts, as hereinafter more fully described and claimed, having reference to the accompanying drawings, in which—

Figure 1 is a perspective view of a portion of a bicycle with the locks applied. Fig. 2 shows the latch. Fig. 3 illustrates a simple key.

A represents a frame of an ordinary bicycle, and 2 the steering-post having the usual handles 3.

In the embodiment of my invention 4 represents a latch, which is pivoted to a bracket 5, adapted to be clamped to the top bar of the frame. The steering-post carries a complementary keeper portion 6, with which the latch 4 is adapted to engage and when engaged prevent the post and front wheel being turned. The latch member 4 has a concaved portion 7 extending across one end, which is adapted to come in contact with the top bar of the frame when the latch is thrown back out of engagement with the keeper 6. If desired, the contacting surface of the part 7 may be lined with felt or other resilient material to prevent vibration of the parts when the latch is resting on the frame-bar.

If it is desired to prevent the use of the wheel by an unauthorized person when the latch and keeper have been engaged and the machine left standing unguarded, some suitable lock may be employed in conjunction with the latch and keeper, which will hold the parts rigidly together. As here shown, the latch 4 is provided with a transverse slot or notch 8, enlarged, as at 9, at its upper end and adapted to engage with a pin 10, carried by the keeper 6 when the pin is turned to present its narrow edge in the path of the slot 8. With the latch fully engaged by the keeper the pin may be turned by a key, as 11, to bring the broad side of the locking-pin 10 crosswise in the enlargement 9 of the notch 8. This will effectually prevent the lifting of the latch 6 out of the keeper. When the owner returns to his bicycle, he turns the lock to release the latch and by lifting the latch and throwing it back frees the steering-post, so that the machine may be ridden.

The latch and keeper may be of any suitable description and may be applied in a variety of ways and assume a variety of forms, the essence of the invention being the employment of complementary engageable and disengageable latch members, one of which is carried by the frame and the other of which is carried by a part turnable in unison with the front wheel.

The present construction is very simple and suitably illustrates the principle of the invention.

Having thus described my invention, what I claim, and desire to secure by Letters Patent, is—

In a bicycle, the combination with a top frame-bar and a steering-post, of a latch pivotally carried by one of said parts and a keeper member fixed to the other part, said latch member being formed rigid with a concaved transversely-extended portion at its free end adapted to substantially conform to the curved upper surface of the top bar of the frame when the latch member is disconnected from the keeper member and thrown back upon the frame-bar.

In testimony whereof I have hereunto set my hand in presence of two subscribing witnesses.

ROBERT NELSON CAUGHELL.

Witnesses:
 JOSEPH HENRY STORY,
 J. R. OSTLER.